(12) United States Patent  (10) Patent No.: US 7,849,159 B2
Elman et al.  (45) Date of Patent: Dec. 7, 2010

(54) METHOD AND APPARATUS FOR DISTRIBUTING BINARY PRESENTATIONS WITHIN DIGITAL MEDIA CONTENT FILES

(75) Inventors: Joshua E. Elman, Seattle, WA (US); Jeffrey Martin Chasen, Bellevue, WA (US)

(73) Assignee: RealNetworks, Inc., Seattle, WA (US)

( * ) Notice: Subject to any disclaimer, the term of this patent is extended or adjusted under 35 U.S.C. 154(b) by 1599 days.

(21) Appl. No.: 10/302,670

(22) Filed: Nov. 22, 2002

(65) Prior Publication Data

US 2004/0103207 A1   May 27, 2004

(51) Int. Cl.
*G06F 15/16* (2006.01)
(52) U.S. Cl. .................. 709/219; 709/217; 709/231
(58) Field of Classification Search .................. 709/231
See application file for complete search history.

(56) References Cited

U.S. PATENT DOCUMENTS

| | | | | |
|---|---|---|---|---|
| 5,774,666 | A * | 6/1998 | Portuesi ..................... | 725/110 |
| 5,778,181 | A * | 7/1998 | Hidary et al. ............... | 725/110 |
| 5,959,627 | A * | 9/1999 | Duwaer et al. ............. | 715/797 |
| 6,025,841 | A * | 2/2000 | Finkelstein et al. ......... | 715/803 |
| 6,248,946 | B1 * | 6/2001 | Dwek .......................... | 84/609 |
| 6,452,609 | B1 * | 9/2002 | Katinsky et al. ............ | 715/716 |
| 6,615,248 | B1 * | 9/2003 | Smith ......................... | 709/217 |
| 6,708,217 | B1 * | 3/2004 | Colson et al. ............... | 709/231 |
| 6,807,570 | B1 * | 10/2004 | Allen et al. ................. | 709/219 |
| 6,904,566 | B2 * | 6/2005 | Feller et al. ................. | 715/728 |
| 6,959,449 | B1 * | 10/2005 | Fujii ........................... | 709/219 |
| 7,149,958 | B2 * | 12/2006 | Landsman et al. .......... | 709/219 |
| 2002/0194306 | A1 * | 12/2002 | Tilt et al. .................... | 709/219 |
| 2003/0212762 | A1 * | 11/2003 | Barnes et al. ............... | 709/219 |

OTHER PUBLICATIONS

Nilsson, M., "ID3 tag version 2.3.0," Feb. 3, 1999, http://www.id3lib.org/id3/id3v2.3.0.txt; printed Oct. 9, 2003, 32 pgs.
Nilsson, M., "ID3 tag version 2.4.0-Main Structure," Sep. 16, 2001, http://www.id3lib.org/id3/id3v2.4.0-structure.txt; printed Oct. 9, 2003, 12 pgs.

* cited by examiner

*Primary Examiner*—Hassan Phillips
(74) *Attorney, Agent, or Firm*—AEON Law; Adam L.K. Philipp

(57) ABSTRACT

A method and apparatus for distributing binary presentations within digital media content files includes receiving a first digital media content file of a first digital media file type and including first digital media content and a binary presentation embedded within the digital media file, facilitating rendering of the binary presentation contemporaneously with rendering of the first digital media content, receiving a second digital media content file of a second digital media file type and including second digital media content and the binary presentation embedded within the second digital media file, and facilitating rendering of the binary presentation contemporaneously with the rendering of the second digital audio content.

42 Claims, 7 Drawing Sheets

```
Name    Track                   ;track category
Type    {Grouping}              ;could be Text, Number, Date, Reference
Flags   {None}                  ;could be Read Only, Private
Value   {Empty}                 ;empty cause grouping
    Name    {Name}              ;name property in track category
    Type    {Text}
    Flags   {None}
    Value   {MyTrackName}

Name    {Year}              ;year property in track category
    Type    {Number}
    Flags   {None}
    Value   {2002}

Name    {Album}                 ;Album category
Type    {Grouping}
Flags   {None}
Value   {Empty}                 ;empty cause grouping
    Name    {Name}              ;name property in album category
    Type    {Text}
    Flags   {None}
    Value   {MyAlbum}

502 ⎰ Name    {Playback Specifications}  ;playback specifications
    ⎨                                    ;category
    ⎪ Type    {Grouping}
    ⎪ Flags   {None}
    ⎩ Value   {None}

⎧ Name    {Binary Presentation}  ;binary presentation
        ⎪                                ;property in playback
        ⎪                                ;specifications category
        ⎨ Type    {Reference}
        ⎪ Value   {app/zip}      ;(generally Mimetype of binary
        ⎪                        ; presentation}
        ⎪ Flags           {None}
        ⎪ Data Size       {Size}
        ⎩ Encap.object    {Binary Data}
```

FIGURE 5

METHOD AND APPARATUS FOR DISTRIBUTING BINARY PRESENTATIONS WITHIN DIGITAL MEDIA CONTENT FILES

BACKGROUND OF THE INVENTION

1. Field of the Invention

The present invention relates generally to the field of digital media. More specifically, the present invention relates to a method and apparatus for distributing binary presentations within digital media content files.

2. Background Information

With advances in integrated circuit, microprocessor, networking and communication technologies, an increasing number of devices, in particular, digital computing devices, are being networked together to facilitate the exchange of information. Accordingly, traditional audio and video content providers such as radio and television studios, recording associations, independent recording artists, and so forth, are turning to digital communication networks such as the Internet for dissemination and distribution of multimedia content.

Typically such multimedia content is provided in the form of a file that can be downloaded and subsequently rendered through a "viewer" or "player", or the multimedia content is streamed where the media begins to be rendered by a viewer/player before the entire media clip is fully retrieved. Due to the nature of digital media, however, multimedia content files are typically quite large (e.g. in the Megabytes of data size), often necessitating that consumers or receivers of the distributed multimedia utilize high-bandwidth network/Internet connections when attempting to consume or retrieve the media in order to mitigate any perceived quality degradation as well as decrease download/access times.

A variety of audio and/or video (hereinafter "audio/video") compression standards or frameworks (such as MPEG-1, MPEG-2, MP3 & MPEG-4 from the Motion Picture Expert's Group, RealMedia and RealAudio from RealNetworks Corporation, Windows Media Audio format from Microsoft Corporation, and so forth) have been introduced to, among other things, reduce multimedia file sizes in an architected manner. For example, the MP3 compression scheme utilizes perceptual audio coding and psychoacoustic compression to remove redundant and irrelevant parts of a digital sound signal resulting e.g. in nearly a twelve-fold decrease in audio file size.

Although through the continued introduction of new standards and compression schemes the sizes of individual multimedia files are continually being reduced, distribution of presentations including multiple such multimedia files as well as the integration of non-audio/video data into multimedia files remains problematic. For example, current distribution methods for distributing one or more web pages containing a variety of audio and video (still and/or motion) content to another party, require the each source audio clip, video clip, image, URL, flash presentation, and so forth referenced by the web page(s) needs to be provided separately to the recipient. Moreover, the original file and directory structures utilized by the web page(s) also need to be maintained during the transfer/distribution. Depending upon the number of audio/visual components displayed on a given web page let alone the audio/visual components displayed on the web pages further referenced by the initial page, distribution may prove difficult and time consuming.

BRIEF DESCRIPTION OF DRAWINGS

The present invention will be described by way of exemplary embodiments, but not limitations, illustrated in the accompanying drawings in which like references denote similar elements, and in which:

FIG. 5 illustrates an example hierarchical data structure including a binary presentation in accordance with one embodiment of the invention;

DETAILED DESCRIPTION OF EMBODIMENTS OF THE INVENTION

The present invention describes a method and apparatus for distributing binary presentations within media content files. As will be apparent from the following description, the terms "media content" and "multimedia content" are used interchangeably herein to broadly refer to digital data including but not limited to audio and video (including motion video and still images) clips, files, and streams, web page representations, flash representations, and so forth, whether alone or combined. Similarly, the use of the term "binary presentation" herein is intended to broadly refer to binary data that references one or more additional data files, such as encoded binary files or text-based files. For example, a binary file including an archive, HTML, SMIL, etc., may itself reference a multitude of binary audio/video content, URLs, archives, HTML, SMIL and so forth. Furthermore, the term "embedding" or "embedded" is used herein to broadly refer to the process or quality of a first set of self-contained digital data (including programming instructions) to be included or referenced within a second set of self-contained digital data. The embedded data may be enclosed/surrounded by the second set of data, or it may merely be appended to, prepended to or even overlayed upon the second set of data.

In the description to follow, various aspects of the present invention will be described, and specific configurations will be set forth. However, the present invention may be practiced with only some or all aspects, and/or without some of these specific details. In other instances, well-known features are omitted or simplified in order not to obscure the present invention.

The description will be presented in terms of operations performed by a processor based device, using terms such as receiving, determining, rendering, displaying and the like, consistent with the manner commonly employed by those skilled in the art to convey the substance of their work to others skilled in the art. As is well understood by those skilled in the art, the quantities take the form of electrical, magnetic, or optical signals capable of being stored, transferred, combined, and otherwise manipulated through mechanical, electrical and/or optical components of the processor based device.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The description repeatedly uses the phrase "in one embodiment", which ordinarily does not refer to the same embodiment, although it may. The terms "comprising", "including", "having", and the like, as used in the present application, are synonymous.

Overview

Figure 1:
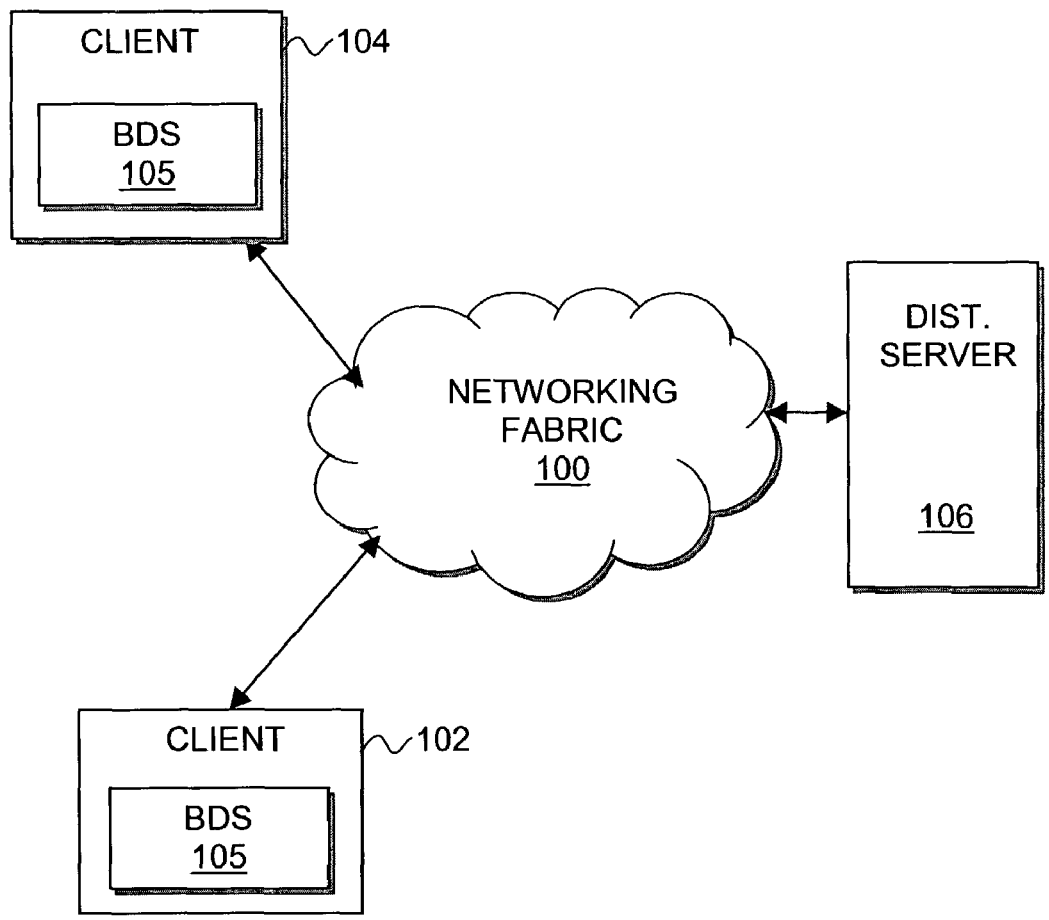
FIG. 1 illustrates an overview of the present invention in accordance with one embodiment.

Referring now to FIG. 1, wherein a block diagram illustrating an overview of the present invention, in accordance with one embodiment, is shown. As illustrated for the embodiment, client system 102 and client system 104 are each individually and advantageously equipped with binary distribution facilities 105 incorporating the teachings of the present invention. Client systems 102 and 104 each may represent a broad range of digital systems known in the art, including but not limited to devices such as wireless mobile phones, palm sized personal digital assistants, notebook computers, desktop computers, set-top boxes, game consoles, and so forth. Clients 102 and 104 are communicatively coupled to distribution server 106 (hereinafter "server 106") via networking fabric 100, where networking fabric 100 may represent one or more interconnected data networks, such as, but not limited to the Internet or World Wide Web.

Although depicted as a single device, server 106 may represent one or more of a broad range of digital systems and servers known in the art to store and host digital multimedia content such as audio/video (streaming or otherwise) as well as other data for the benefit of one or more client or consumer devices communicatively coupled to server 106 via e.g. networking fabric 100. In one embodiment of the invention, server 106 stores and/or distributes media files and/or media streams to e.g. clients 102 and 104 on behalf of various third parties such as radio and television studios, recording associations, recording artists, as well as other audio and/or video publishers (not shown). In doing so, server 106 may apply one or more data compression and/or encryption algorithms known in the art including but not limited to those in accordance with MPEG-1, MPEG-2, MP3, and MPEG-4, Windows Media Audio, RealMedia and RealAudio. In accordance with one embodiment of the invention, server 106 may store and/or distribute media files having one or more binary presentations embedded therein in accordance with the teachings of the present invention. In one embodiment, where a media file contains timeline-based audio and/or video content, the embedded data may include a non-timeline-based binary presentation. In an embodiment where a media file contains timeline-based audio and/or video content, the embedded data may similarly include a timeline-based binary presentation.

Binary distribution facilities 105 represent at least a subset of logic functions designed to advantageously provide embedding/insertion facilities to embed one or more binary files and/or presentations within a digital media content file, detection facilities to detect such binary file(s)/presentation(s), and extraction/rendering facilities to extract such binary presentation(s) from the digital media content and to facilitate the subsequent rendering of the binary presentation(s) for user/consumer viewing. The term "rendering" as used herein refers to the act or process of displaying, generating, or causing to display/generate an image or graphical representation as it applies in visual rendering, as well as generating one or more sounds or tones or digital representations of the sounds or tones as it applies in aural rendering.

In one embodiment, client 102 functioning as a content author utilizes binary distribution facilities 105 of the present invention to embed a binary presentation within a digital media file including audio/video content. Once the binary presentation has been embedded within the digital media file, client 102 may transmit the digital media file containing the embedded binary presentation to either server 106 for further distribution to e.g. client 104 (as well as other clients and servers communicatively coupled to server 106) through networking fabric 100, or to client 104 with or without the facilitation of server 106.

In one embodiment, client 104 equipped with the binary distribution facilities of the present invention and acting as a content consumer receives the digital media file containing the embedded binary presentation from e.g. either client 102 or server 106. In response, binary distribution facilities 105 of client 104 first determines whether the digital media file contains an embedded binary presentation, and if so, renders the binary presentation along with the digital media content. Accordingly, a binary presentation (whether it includes HTML, SMIL, Flash, audio content/video content and/or an archive) can be distributed to a content consumer through the distribution of a single digital media content file, without the need for the content consumer to obtain any additional digital media files. In one embodiment, the embedded binary presentation may be rendered contemporaneous with the associated digital media content. For example, the binary presentation and the digital media content may represent two processes on the same thread. Additionally, rendering of the digital media content (whether in the form of a stream or static media clip) may cause the embedded binary presentation or a sub-portion of the embedded binary presentation to be accessed and/or referenced more than one time during the rendering of the digital media content.

Example Client System

Figure 2:
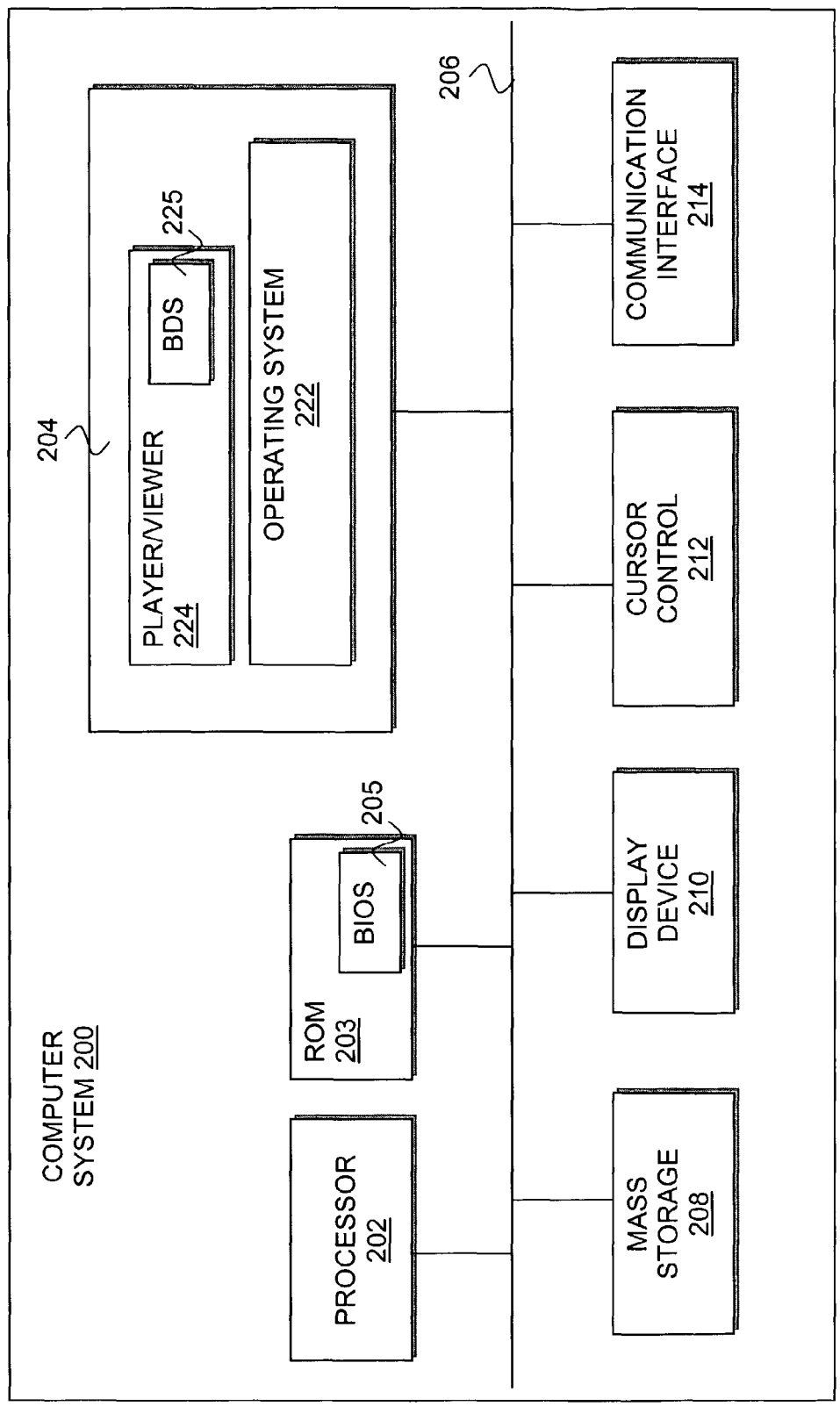
FIG. 2 illustrates an example computer system suitable for practicing the present invention.

FIG. 2 illustrates an example computer system suitable for practicing the present invention. As shown, example computer system 200 includes processor 202, ROM 203 including basic input/output system (BIOS) 205, and system memory 204 coupled to each other via "bus" 206. Also coupled to "bus" 206 are non-volatile mass storage 208, display device 210, cursor control device 212 and communication interface 214. During operation, memory 204 includes working copies of operating system 222, and digital media content player/viewer 224 including binary distribution facilities 225 of the present invention to embed and render binary presentations and audio/video content in accordance with the teachings of the present invention. In one embodiment, operating system 222 is a Microsoft Windows based operating system that interacts with player/viewer 224 (including binary distribution facilities 225) to facilitate rendering of Windows Media Audio based content files.

Except for the teachings of the present invention as incorporated herein, each of these elements is intended to represent a wide range of these devices known in the art, and otherwise performs its conventional functions. For example, processor 202 may be a processor of the Pentium® family available from Intel Corporation of Santa Clara, Calif., which performs its conventional function of executing programming instructions of operating system 222 and player/viewer 224, including those implementing the teachings of the present invention. ROM 203 may be EEPROM, Flash and the like, and memory 204 may be SDRAM, DRAM and the like, from semiconductor manufacturers such as Micron Technology of Boise, Id. Bus 206 may be a single bus or a multiple bus implementation. In other words, bus 206 may include multiple properly bridged buses of identical or different kinds, such as Local Bus, VESA, ISA, EISA, PCI and the like.

Mass storage 208 may represent disk drives, CDROMs, DVD-ROMs, DVD-RAMs and the like. Typically, mass storage 208 includes the permanent copy of operating system 222 and player/viewer 224. The permanent copy may be downloaded from a distribution server through a data network (such as the Internet), or installed in the factory, or in the field. For field installation, the permanent copy may be distributed using one or more articles of manufacture such as diskettes, CDROM, DVD and the like, having a recordable medium including but not limited to magnetic, optical, and other mediums of the like.

Display device 210 may represent any of a variety of display types including but not limited to a CRT and active/passive matrix LCD display, while cursor control 212 may represent a mouse, a touch pad, a track ball, a keyboard, and the like to facilitate user input. Communication interface 214 may represent a modem interface, an ISDN adapter, a DSL interface, an Ethernet or Token ring network interface and the like.

As those skilled in the art will also appreciate, from the description the follow, the present invention may also be practiced without some of the above-enumerated elements, or with additional elements.

Player/Viewer Architectural Embodiments

Figure 3:
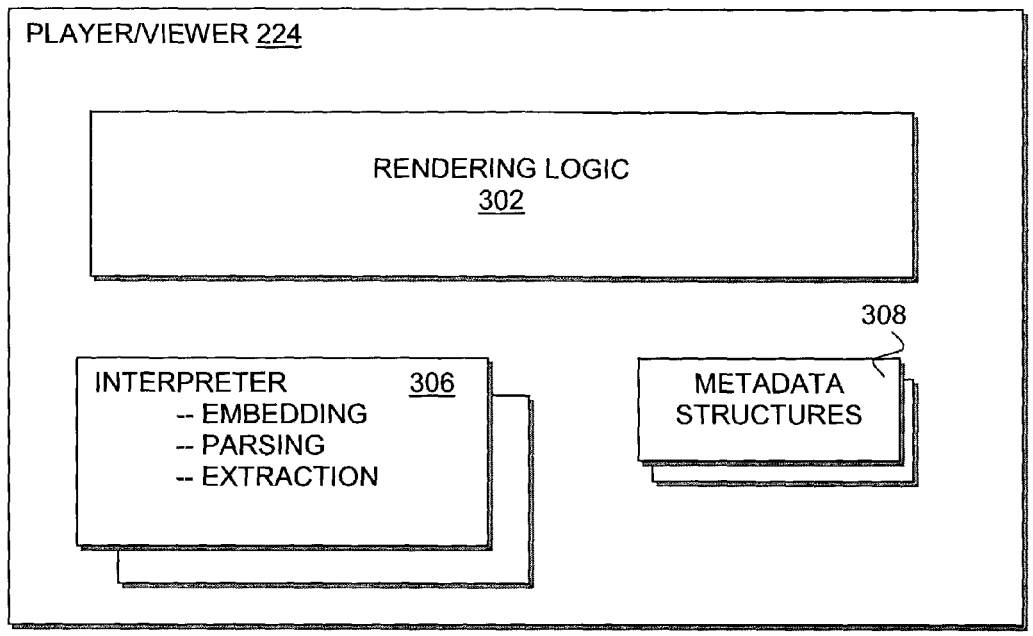
FIG. 3 is a block diagram illustrating one embodiment of a player/viewer including binary distribution services of the present invention.

FIG. 3 is a block diagram illustrating one embodiment of player/viewer 224 including binary distribution services of the present invention. As shown in the illustrated embodiment, player/viewer 224, includes interpreter(s) 306, metadata structures 308, rendering logic 302, and metadata engine 304.

Rendering logic 302 includes one or more CODECS (not shown) for rendering one or more of a variety of audio and/or video content types. In one embodiment, each of interpreter(s) 306 represents logic for embedding a binary presentation within a media content file, as well as detecting and extracting a previously embedded binary presentation from a media content file. In one embodiment, one or more of interpreter(s) 306 operate to serialize (i.e. store in a linear data block) hierarchical metadata structure(s) 308 populated with name-value pairs, and embed a binary presentation within a media content file based upon metadata properties stored in metadata structure(s) 308. Conversely, in one embodiment, one or more of interpreter(s) 306 operate to populate hierarchical metadata structure(s) 308 based upon file type-specific data/content (e.g. name-value pairs) contained in, and read from a particular media content file. Populated metadata structure(s) 308 is/are then utilized by rendering logic 302 to facilitate rendering of the audio and/or video content of the media content file in accordance with one or more corresponding global or proprietary CODECS for example. In one embodiment, rendering logic 302 queries populated metadata structure(s) 308 searching for specific properties and values, and performs behaviors based on these values. For example, in the case of a global property "Track:Name", rendering logic 302 searches metadata structure(s) 308 for the track name (e.g. of a CD track), and subsequently renders the track name in e.g. a status pane of player/viewer 224. In the case of a unique property indicating the presence of a binary presentation, however, rendering logic 302 searches metadata structure(s) 308 for the specific property and if found, invokes one of either interpreters 306 or metadata engine 304 to extract the binary presentation from and render the presentation contemporaneously (i.e. at substantially the same time) with the starting of the media content contained within the file.

Each file type-specific interpreter 306 can independently open a file of a corresponding file type, read the metadata in the file-specific format, and convert the metadata into a hierarchical representation for use by rendering logic 302. In one embodiment, in addition to interpreter(s) 306, metadata engine 304 includes facilities for adding, changing, iterating, and searching hierarchical name value pairs of metadata structure(s) 308, as well as serializing hierarchical metadata structure(s) 308 into a linear data block. Thus, in the event player/viewer 224 is equipped with its own proprietary serialized file format, one or more of interpreter(s) 306 can use the proprietary serialized file format to read the data block, and pass the read data block to metadata engine 304 for hierarchical conversion by metadata engine 304 in a format-independent method. At the same time, others of interpreter(s) 306 can use previously associated serialized file formats to read data blocks of corresponding file-types and process the data accordingly without making calls to metadata engine 304.

In accordance with one embodiment of the invention, interpreter(s) 306 (and/or metadata engine 304) are implemented in an object-oriented manner, with each of interpreter(s) 306 automatically having a number of associated methods (pre-provided). In one embodiment, each of interpreter(s) 306 includes GetValueFromProperty and GetSubProperty methods that operate over hierarchical metadata structure(s) 308 to populate metadata structure(s) 308 with the metadata, as well as methods for adding, changing, iterating, and searching the name value pairs of hierarchical metadata structure(s) 308.

Binary Presentation Embedding Process

Figure 4:
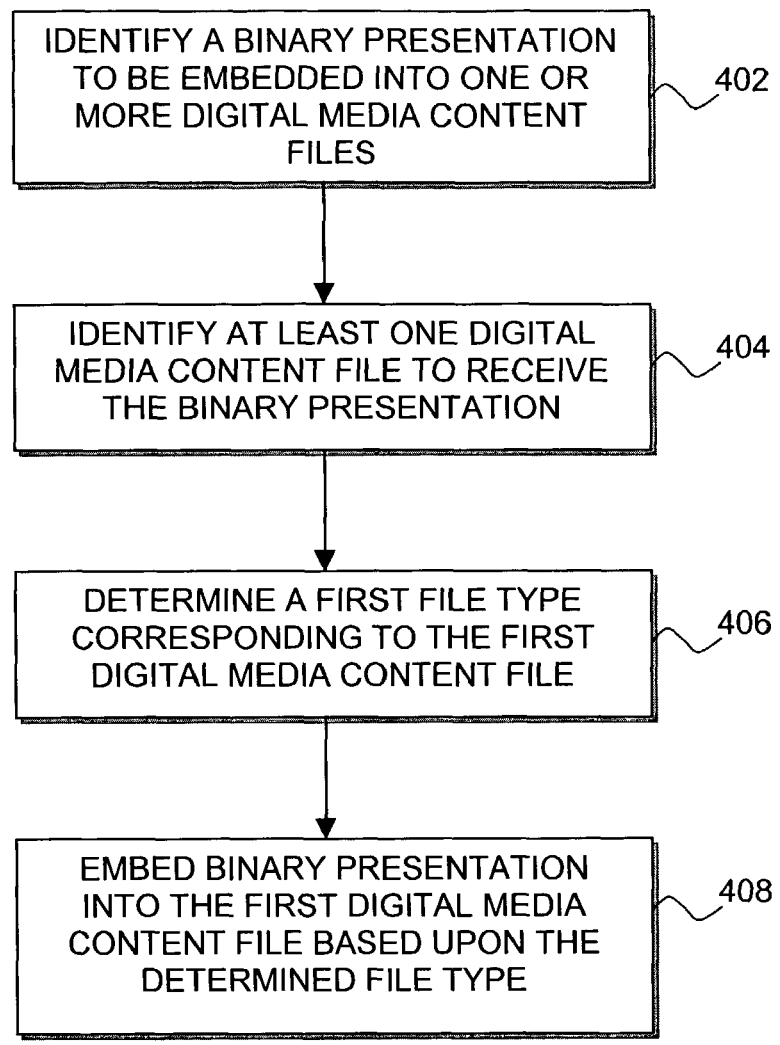
FIG. 4 illustrates a method for embedding a binary presentation into one or more digital media content files in accordance with one embodiment of the invention.

FIG. 4 illustrates a method for embedding a binary presentation into one or more digital media content files in accordance with one embodiment of the invention. To begin, a binary presentation to be embedded within the one or more media content files is identified (block 402), and at least one digital media content file is identified to receive the binary presentation (block 404). In one embodiment, the binary presentation and media content files are identified by way of a user/author (e.g. with a user input device). Next, the one or more file types corresponding to the identified digital media content file(s) are determined (block 406), and the binary presentation is inserted into the identified digital media content file(s) (block 408). In one embodiment, interpreter 306 receives data as hierarchical name-value pairs (e.g. through a user input dialog), which is subsequently serialized and inserted into the one or more media content files. In one embodiment, interpreter 306 may utilize metadata engine 304 to serialize the hierarchical data into linear data that can be written to a file. In one embodiment the binary presentation is indicated within the media content file by one or more header or footer properties prepended or appended to the media (e.g. audio/video) content, respectively.

Example Binary Presentation Data Structure and Embedding Formats

FIG. 5 illustrates an example hierarchical data structure of a media content file including an embedded binary presentation 504 in accordance with one embodiment of the invention. As shown, various categories and properties associated with the categories are defined in the form of named value pairs. In one embodiment the name value pairs illustrated in FIG. 5 are represented in a data representation language such as XML.

In the illustrated data structure, various text based metadata associated with the content including track name, year, and album name are shown. Additionally, a uniquely identifiable category named "playback specifications" 502 containing a binary presentation property and including an embedded binary presentation is defined. The binary presentation property includes various name-value pairs including the mime-type associated with the embedded binary presentation as well as the size of the binary presentation and the binary presentation itself.

Example A illustrates an example notation for indicating (e.g. to interpreter 306) the presence of a binary presentation in an MP3 based content file including ID3v2.3.0 defined tags as defined by ID3 tag standard version ID3v2.3.0, authored by M. Nilsson on Feb. 3, 1999 and available from www.id3lib.org/id3/id3v2.3.0.txt. As shown in the example, an ID3 GEOB frame is utilized to embed the data structure of FIG. 5 including the binary presentation.

```
<ID3 header>
    <GEOB Header>
        < metadata blob (shown in FIG. 5) >
```

Example A

In one embodiment, a content description property within the GEOB frame is utilized to distinguish between ID3 GEOB frames that contain a binary presentation as described herein, and those ID3 GEOB frames that do not.

Example B illustrates an example notation for indicating the presence of a binary presentation in a RealAudio based content file. As shown, a footer section is created after the data (e.g. media content) section that includes the metadata blob of FIG. 5. The size of the blob appears after the blob so that when seeking back into the file from the end, interpreter 306 or metadata engine 304 can jump back an amount equivalent to the value of the metadata size to get to the beginning of the metadata section within the media content file.

```
Header Data
    File properties
    Stream properties
Data block
Footer Data
    Metadata properties (shown in FIG. 5)
    Metadata size
```

Example B

Binary Presentation Rendering Process

Figure 6:
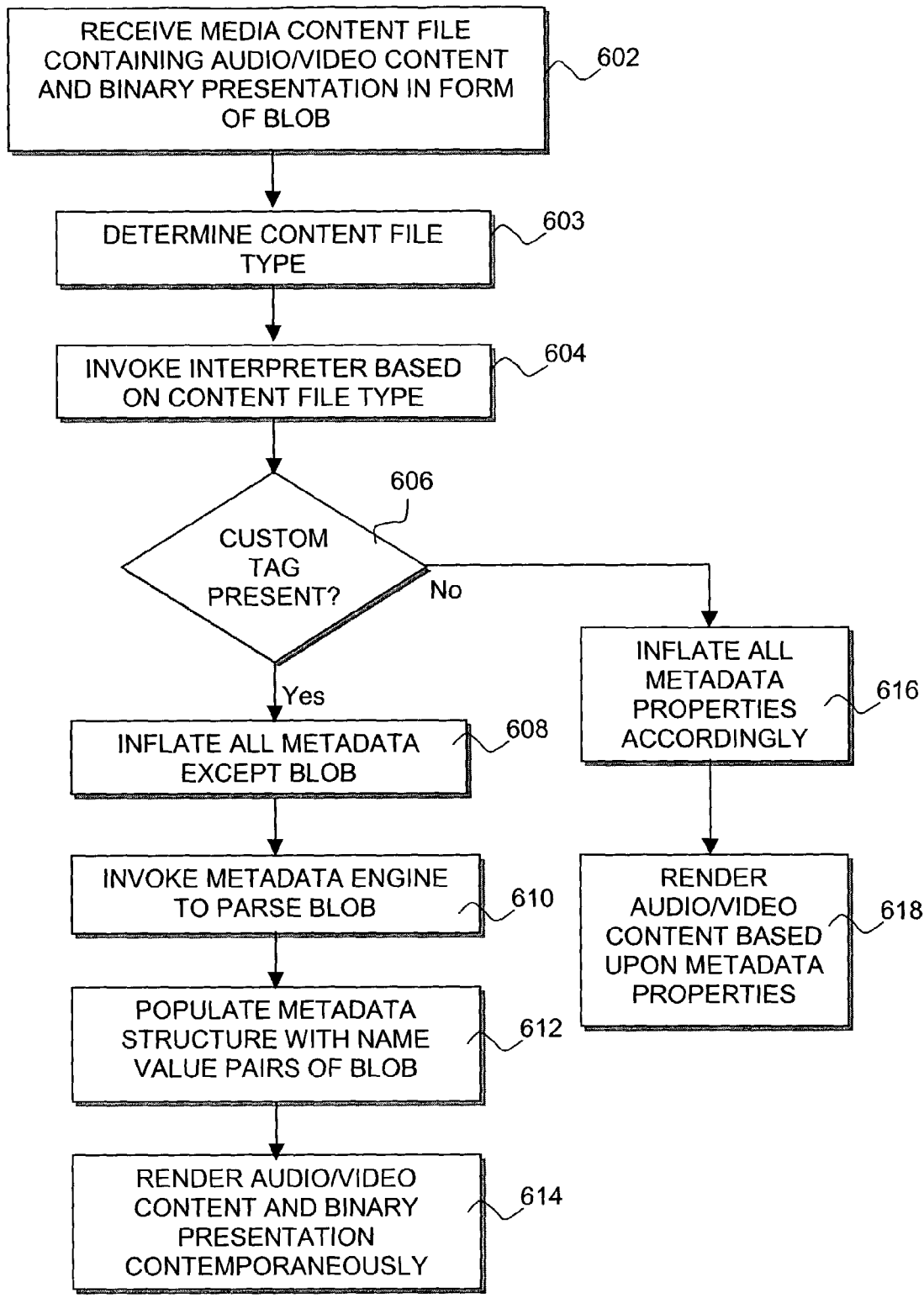
FIG. 6 illustrates a method of rendering an embedded binary presentation in accordance with one embodiment of the invention.

FIG. 6 illustrates a method of rendering an embedded binary presentation in accordance with one embodiment of the invention. As shown for illustrated embodiment, the process begins with player/viewer 224 receiving (via client 102/104) a media content file containing audio/video content and a binary presentation in the form of a large binary object "BLOB" (block 602). Upon receiving a media content file, player/viewer 224 determines the type (i.e. data format) of media content file received (block 603). For example, the media content file may be an MP3 content file-type, an MPEG-4 content file-type, a Windows Media Audio file type, a RealMedia/RealAudio file type, and so forth. In one embodiment, the determination is made based upon the media content file filename extension, whereas in other embodiments player/viewer 224 may analyze one or more aspects of the media content file in order to determine the media content file's file-type. Next, an interpreter 306 corresponding with the determined file type is invoked to translate serialized data associated with that file type to abstracted name value pairs for use by rendering logic 302 (block 604). During the translation process, interpreter 306 determines whether a custom property tag indicating the presence of a binary presentation is present within the content file (block 606). If not, interpreter 306 deserializes (i.e. translates to a hierarchical metadata structure) the contents of the content file (block 616), after which time player/viewer 224 renders the media content contained in the media content file based upon the deserialized metadata properties (block 618).

However, if at block 606 interpreter 306 determines that a custom property tag indicating the presence of a binary presentation is present within the content file, interpreter 306 proceeds to deserialize all the metadata contained within the content file with the exception of the binary blob (block 608). Instead, metadata engine 304 is invoked to parse the binary blob (block 610) and populate metadata structure(s) 308 with name value pairs as a result of the parsing process (block 612). Lastly, the audio/video content contained within the media content file is rendered by rendering logic 302 contemporaneous with the rendering of the binary presentation (block 614). In other embodiments, interpreter 306 may perform all or a portion of the handling of the blob including the binary presentation.

Figure 7:
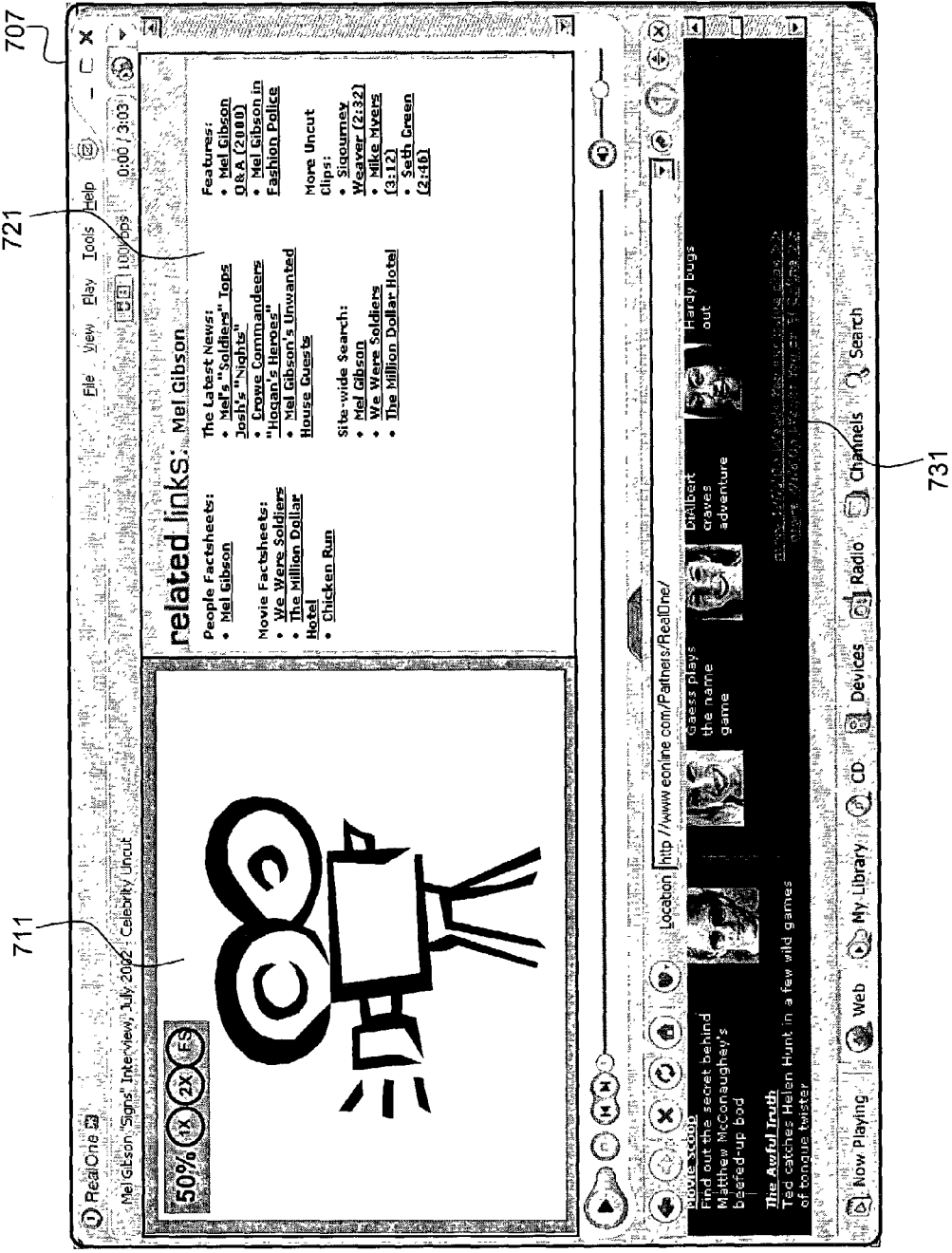
FIG. 7 illustrates an example of a rendered binary presentation of multi-pane application window.

FIG. 7 illustrates an example of a rendered binary presentation of multi-pane application window. Application window 707 contains windowpane 711, windowpane 721 and windowpane 731 as shown. In the illustrated embodiment, windowpane 731 displays one or more web pages based upon user input, windowpane 711 displays streaming video content based upon user input provided through windowpane 731 (and/or windowpane 721), and windowpane 721 displays HTML-based or other types of context information associated with the rendered video content of windowpane 711, In accordance with one embodiment of the invention, the various windowpanes of application window 707 as well as the content displayed within those windowpanes together represent a rendered binary presentation previously embedded within a media content file. In one embodiment, the binary presentation of FIG. 7 is rendered contemporaneously with the digital media content displayed e.g. within windowpane 711.

EPILOG

While the present invention has been described in terms of the above-illustrated embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A computer-implemented method comprising:
   receiving, via a networking fabric, a first media content file of a first digital media file type;
   invoking a first interpreter corresponding to said first digital media file type, said first interpreter determining, according to a property of said first media content file, that said first media content file includes first media content and a first binary presentation comprising a first binary data file;

facilitating rendering of the first binary presentation in a first pane of an application window contemporaneously with rendering of the first media content in a second pane of said application window;

receiving, via said networking fabric, a second media content file of a second digital media file type;

invoking a second interpreter corresponding to said second digital media file type, said second interpreter determining, according to a property of said second media content file, that said second media content file includes second media content and a second binary presentation comprising a second binary data file; and facilitating rendering of the second binary presentation in said first pane of said application window contemporaneously with rendering of the second media content in said second pane of said application window.

2. The method of claim 1, wherein the first binary presentation is prepended to the first media content in the first media content file.

3. The method of claim 2, wherein the second binary presentation is appended to the second media content in the second media content file.

4. The method of claim 1, wherein the first binary presentation is appended to the first media content in the first media content file.

5. The method of claim 1, wherein at least one of the first and second media content includes a metadata section within which at least one of the first and second binary presentations is included.

6. The method of claim 1, wherein at least one of the first and the second media content comprises streamed timeline-based data and at least one of the first and second binary presentations contains non-timeline based data.

7. In a digital media content player, a method comprising:
receiving, via a networking fabric, a first media file, selected from at least one of an audio file and a video file, including first audio content and a first binary presentation comprising a first binary data file that references a first additional data file, wherein said first binary presentation is included within the first digital media file such that the included first binary presentation is self-contained within the first digital media file;

determining a first media file type of a plurality of media file types to which the first media file corresponds;

invoking one of a plurality of interpreters based upon the first media file type to extract the first included binary presentation from the first media file and pass the binary presentation to a rendering engine to facilitate rendering of the first binary presentation while the first audio content is being rendered;

receiving, via said networking fabric, a second media file, selected from at least one of an audio file and a video file, including second audio content and a second binary presentation comprising a second binary data file that references a second additional data file, wherein said second binary presentation is included within the second digital media file such that the included second binary presentation is self-contained within the second digital media file;

determining a second media file type of the plurality of media file types to which the second media file corresponds; and invoking a second of the plurality of interpreters based upon the second media file type to extract the second included binary presentation from the second media file and pass the binary presentation to the rendering engine to facilitate rendering of the second binary presentation while the second audio content is being rendered.

8. The method of claim 7, wherein the first binary presentation is prepended to the first audio content in the first media file.

9. The method of claim 8, wherein the second binary presentation is appended to the second audio content in the second media file.

10. The method of claim 7, wherein the first binary presentation is appended to the first audio content in the first media file.

11. The method of claim 7, wherein at least one of the first and second audio content includes a metadata section within which at least one of the first and second binary presentations is included.

12. The method of claim 7, wherein at least one of the first and the second digital audio content comprises streamed timeline-based data and at least one of the first and second binary presentations contains non-timeline based data.

13. A computer-implemented method comprising:
identifying a binary presentation comprising a binary data file, the binary presentation to be included into one or more of a plurality of digital media content files for distribution, via a networking fabric, as a component of the one or more digital media content files;

identifying a first of the plurality of digital media content files to receive the binary presentation;

determining a first file type corresponding to the first digital media content file; and including a presentation property tag and the binary presentation into the first digital media content file, in accordance with a file type-specific data mapping, to facilitate subsequent extraction, via a file type-specific interpreter, of the binary presentation from the first digital media content file and rendering of the binary presentation in a first pane of an application window contemporaneous with rendering of the first digital media content file in a second pane of said application window.

14. The method of claim 13, wherein the binary presentation is prepended to the first media content in the first media content file.

15. The method of claim 14, wherein the binary presentation is appended to a second media content in a second media content file.

16. The method of claim 13, wherein the binary presentation is appended to the first media content in the first media content file.

17. The method of claim 13, wherein at least one of the first media content, of a first media content file, and a second media content, of a second media content file, includes a metadata section within which the binary presentation is included.

18. The method of claim 13, wherein at least one of the first media content, of a first media content file, and a second media content, of a second media content file, comprises streamed timeline-based data and the binary presentation contains non-timeline based data.

19. A non-transitory recordable medium having instructions stored thereon, which when executed, implement a method comprising:
receiving, via a networking fabric, a first media content file of a first digital media file type;

invoking a first interpreter corresponding to said first digital media file type, said first interpreter determining, according to a property of said first media content file, that said first media content file includes first media content and a first binary presentation comprising a first binary data file;

rendering the first binary presentation in a first pane of an application window contemporaneously with rendering of the first media content in a second pane of said application window;

receiving, via said networking fabric, a second media content file of a second digital media file type;

invoking a second interpreter corresponding to said second digital media file type, said second interpreter determining, according to a property of said second media content file, that said second media content file includes second media content and a second binary presentation comprising a second binary data file; and rendering the second binary presentation in said first pane of said application window contemporaneously with rendering of the second media content in said second pane of said application window.

20. The method of claim 19, wherein the first binary presentation is prepended to the first media content in the first media content file.

21. The method of claim 20, wherein the second binary presentation is appended to the second media content in the second media content file.

22. The method of claim 19, wherein the first binary presentation is appended to the first media content in the first media content file.

23. The method of claim 19, wherein at least one of the first and second media content includes a metadata section within which at least one of the first and second binary presentations is included.

24. The method of claim 19, wherein at least one of the first and the second digital media content comprises streamed timeline-based data and at least one of the first and second binary presentations contains non-timeline based data.

25. A non-transitory recordable medium having instructions stored thereon, which when executed, implement a method comprising:

identifying a binary presentation comprising a binary data file, the binary presentation to be included into one or more of a plurality of digital media content files for distribution, via a networking fabric, as a component of the one or more digital media content files;

identifying a first of the plurality of digital media content files to receive the binary presentation;

determining a first file type corresponding to the first digital media content file; and including a presentation property tag and the binary presentation into the first digital media content file, in accordance with a file type-specific data mapping, to facilitate subsequent extraction, via a file type-specific interpreter, of the binary presentation from the first digital media content file and rendering of the binary presentation in a first pane of an application window contemporaneous with rendering of the first digital media content file in a second pane of said application window.

26. The method of claim 25, wherein the binary presentation is prepended to the first media content in the first media content file.

27. The method of claim 26, wherein a second binary presentation is appended to a second media content in a second media content file.

28. The method of claim 25, wherein the binary presentation is appended to the first media content in the first media content file.

29. The method of claim 25, wherein at least one of the first media content, of a first media content file, and a second media content, of a second media content file, includes a metadata section within which at least one of the first and second binary presentations is included.

30. The method of claim 25, wherein at least one of the first media content, of a first media content file, and a second media content, of a second media content file, comprises streamed timeline-based data and at least one of the first and second binary presentations contains non-timeline based data.

31. An apparatus comprising:

a non-transitory storage medium having stored therein programming instructions designed to enable the apparatus to:

receive, via a networking fabric, a first media content file of a first digital media file type;

invoking a first interpreter corresponding to said first digital media file type, said first interpreter determining, according to a property of said first media content file, that said first media content file includes first media content and a first binary presentation comprising a first binary data file;

render the first binary presentation in a first pane of an application window contemporaneously with rendering of the first media content in a second pane of said application window;

receive, via said networking fabric, a second media content file of a second digital media file type;

invoking a second interpreter corresponding to said second digital media file type, said second interpreter determining, according to a property of said second media content file, that said second media content file includes second media content and a second binary presentation comprising a second binary data file; and render the second binary presentation in said first pane of said application window contemporaneously with rendering of the second media content in said second pane of said application window; and at least one processor coupled with the storage medium to execute the programming instructions.

32. The method of claim 31, wherein the first binary presentation is prepended to the first media content in the first media content file.

33. The method of claim 32, wherein the second binary presentation is appended to the second media content in the second media content file.

34. The method of claim 31, wherein the first binary presentation is appended to the first media content in the first media content file.

35. The method of claim 31, wherein at least one of the first and second media content includes a metadata section within which at least one of the first and second binary presentations is included.

36. The method of claim 31, wherein at least one of the first and the second digital media content comprises streamed timeline-based data and at least one of the first and second binary presentations contains non-timeline based data.

37. An apparatus comprising:

a non-transitory storage medium having stored therein programming instructions designed to enable the apparatus to:

identify a binary presentation comprising a binary data file, the binary presentation to be included into one or more of a plurality of digital media content files for distribution, via a networking fabric, as a component of the one or more digital media content files;

identify a first of the plurality of digital media content files to receive the binary presentation, determine a first file type corresponding to the first digital media content file, and include a presentation property tag and the binary presentation into the first digital media content file, in accordance with a file type-specific data mapping, to facilitate subsequent extraction, via a file type-specific interpreter, of the binary presentation from the first digital media content file and rendering of the binary presentation in a first pane of an application window contemporaneous with rendering of the first digital media content file in a second pane of said application window by a digital media content player; and at least one processor coupled with the storage medium to execute the programming instructions.

38. The method of claim 37, wherein the binary presentation is prepended to the first media content in the first media content file.

39. The method of claim 38, wherein the second binary presentation is appended to the second media content in the second media content file.

40. The method of claim 37, wherein the binary presentation is appended to the first media content in the first media content file.

41. The method of claim 37, wherein at least one of the first media content, of a first media content file, and a second media content, of a second media content file, includes a metadata section within which at least one of the first and second binary presentations is included.

42. The method of claim 37, wherein at least one of the first media content, of a first media content file, and a second media content, of a second media content file, comprises streamed timeline-based data and at least one of the first and second binary presentations contains non-timeline based data.

* * * * *